US012327952B2

(12) United States Patent
Nakano et al.

(10) Patent No.: US 12,327,952 B2
(45) Date of Patent: Jun. 10, 2025

(54) ELECTRICAL CONNECTOR WITH RETAINING MEMBER

(71) Applicant: Yazaki Corporation, Tokyo (JP)

(72) Inventors: Katsuya Nakano, Shizuoka (JP); Takashi Sone, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 412 days.

(21) Appl. No.: 17/966,731

(22) Filed: Oct. 14, 2022

(65) Prior Publication Data

US 2023/0118800 A1 Apr. 20, 2023

(30) Foreign Application Priority Data

Oct. 20, 2021 (JP) ................................ 2021-171271

(51) Int. Cl.
*H01R 13/639* (2006.01)
*H01R 13/42* (2006.01)
*H01R 13/629* (2006.01)

(52) U.S. Cl.
CPC ........... *H01R 13/639* (2013.01); *H01R 13/42* (2013.01); *H01R 13/629* (2013.01)

(58) Field of Classification Search
CPC . H01R 13/42; H01R 13/4361; H01R 13/4362
See application file for complete search history.

(56) References Cited

U.S. PATENT DOCUMENTS 6,322,391 B1 * 11/2001 Kodama ............ H01R 13/4223 439/752
7,278,890 B1 * 10/2007 Smutny ............. H01R 13/4361 439/752
7,563,134 B2 * 7/2009 Kim ................... H01R 13/6392 439/752
7,762,854 B1 * 7/2010 Peng ...................... H01R 24/50 439/752
8,727,816 B2 * 5/2014 Takahashi .......... H01R 13/4361 439/752

(Continued)

FOREIGN PATENT DOCUMENTS

JP 2011-34825 A 2/2011
WO 2018/207651 A1 11/2018

*Primary Examiner* — Neil Abrams
(74) *Attorney, Agent, or Firm* — KENEALY VAIDYA LLP

(57) ABSTRACT

A connector includes a retaining member that is held by the terminal housing portion at an assembly completed position to the terminal housing portion to lock movement of the terminal fitting with respect to the terminal housing portion in a terminal extraction direction opposite the terminal insertion direction at the assembly completed position. The retaining member includes a terminal locking portion disposed facing a locked portion of the terminal fitting at the assembly completed position in the terminal extraction direction to lock movement of the locked portion in the terminal extraction direction. The terminal fitting includes a retainer housing portion that accommodates the terminal locking portion of the retaining member at the assembly completed position and allows relative movement of the terminal fitting in the alignment direction with respect to the terminal locking portion and orthogonal to the terminal insertion direction.

9 Claims, 11 Drawing Sheets

(56) References Cited

U.S. PATENT DOCUMENTS

| | | | | |
|---|---|---|---|---|
| 2012/0040553 | A1 | 2/2012 | Tashiro | |
| 2020/0083632 | A1 | 3/2020 | Chiba | |
| 2023/0117463 | A1* | 4/2023 | Yamanashi .......... | H01R 13/639<br>439/752 |
| 2023/0118800 | A1* | 4/2023 | Nakano ................ | H01R 13/426<br>439/352 |
| 2023/0119971 | A1* | 4/2023 | Nakano ................ | H01R 13/629<br>439/271 |

* cited by examiner

ELECTRICAL CONNECTOR WITH RETAINING MEMBER

CROSS-REFERENCE TO RELATED APPLICATION(S)

The present application claims priority to and incorporates by reference the entire contents of Japanese Patent Application No. 2021-171271 filed in Japan on Oct. 20, 2021.

BACKGROUND OF THE INVENTION

1. Field of the Invention

The present invention relates to a connector.

2. Description of the Related Art

A connector has a possibility that, unless a terminal fitting is put at a predetermined design position with respect to a mating terminal fitting, electrical connection quality between the terminal fitting and the mating terminal fitting is not obtained and that overload is caused between parts of the terminal fitting and the mating terminal fitting. Therefore, the conventional connector may be configured such that the terminal fitting is accommodated in a relatively movable state with respect to a housing, and that the physical positional relationship of the terminal fitting with respect to the mating terminal fitting can be adjusted. For example, Japanese Patent Publication Laid-open No. 2011-34825 discloses a connector having such an alignment function of the terminal fitting.

Meanwhile, in a connector, in order to provide the terminal fitting with an alignment function, how to cause a housing to hold the terminal fitting in a state where relative movement in the alignment direction is possible appears as a problem.

SUMMARY OF THE INVENTION

Therefore, an object of the present invention is to provide a connector provided with both the alignment function and the holding function of the terminal fitting.

In order to solve the above mentioned problem and achieve the object, a connector according to one aspect of the present invention includes a terminal fitting including a terminal connection portion that is physically and electrically connected to a mating terminal fitting; a housing provided with a terminal housing portion that inserts and accommodates the terminal fitting in an inside terminal housing chamber in a terminal insertion direction; and a retaining member that is held by the terminal housing portion at an assembly completed position to the terminal housing portion to lock movement of the terminal fitting with respect to the terminal housing portion in a terminal extraction direction opposite the terminal insertion direction at the assembly completed position, wherein the terminal housing chamber is formed as an interior space that allows relative movement of the terminal fitting in an alignment direction orthogonal to the terminal insertion direction, the retaining member includes a terminal locking portion disposed facing a locked portion of the terminal fitting at the assembly completed position on the terminal extraction direction side to lock movement of the locked portion in the terminal extraction direction, and the terminal fitting includes a retainer housing portion that accommodates the terminal locking portion of the retaining member at the assembly completed position and allows relative movement of the terminal fitting in the alignment direction with respect to the terminal locking portion.

According to another aspect of the present invention, in the connector, it is preferable that the retaining member includes: a held portion that is held by the terminal housing portion; and a locked portion that causes the terminal housing portion to lock movement in the terminal extraction direction with respect to the terminal housing portion, and the terminal housing portion includes: a retainer insertion hole to insert the retaining member into the terminal housing chamber in a retainer insertion direction toward the one alignment direction; a retainer holding portion disposed facing the held portion of the retaining member at the assembly completed position in a retainer extraction direction opposite the retainer insertion direction to lock movement of the held portion in the retainer extraction direction; and a retainer locking portion disposed facing the locked portion of the retaining member at the assembly completed position on the terminal extraction direction side to lock movement of the locked portion of the retaining member in the terminal extraction direction.

According to still another aspect of the present invention, in the connector, it is preferable that the terminal housing portion includes a first wall and a second wall forming the terminal housing chamber and disposed facing each other with a space in the alignment direction, the first wall includes the retainer insertion hole and uses a surrounding wall on the terminal extraction direction side of the retainer insertion hole as the retainer locking portion, and the second wall includes a retainer inserting hole that allows the held portion to be inserted outside the chamber from the terminal housing chamber, and uses a surrounding wall of the retainer inserting hole as the retainer holding portion.

According to still another aspect of the present invention, in the connector, it is preferable that the retaining member includes another held portion that is held by the terminal housing portion and provided separately from the one held portion locked by the retainer holding portion of the second wall, and besides the one retainer holding portion provided in the second wall, the terminal housing portion includes, in the first wall, another retainer holding portion disposed facing the other held portion of the retaining member at the assembly completed position in the retainer extraction direction to lock movement of the other held portion in the retainer extraction direction.

According to still another aspect of the present invention, in the connector, it is preferable that the terminal connection portion is formed to have fitting connection to a mating terminal connection portion of the mating terminal fitting in a fitting connection direction along the terminal insertion direction.

According to still another aspect of the present invention, in the connector, it is preferable that the terminal connection portion is formed into a tubular female terminal shape that allows the mating terminal connection portion to be inserted in the terminal extraction direction, the retainer housing portion is formed in side walls in a direction orthogonal to the terminal insertion direction and the alignment direction in the terminal connection portion by cutting the side walls, as the locked portion of the terminal fitting, a surrounding wall on the terminal insertion direction side of the retainer housing portion is used, and the retaining member includes the terminal locking portion for each of the retainer housing portions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
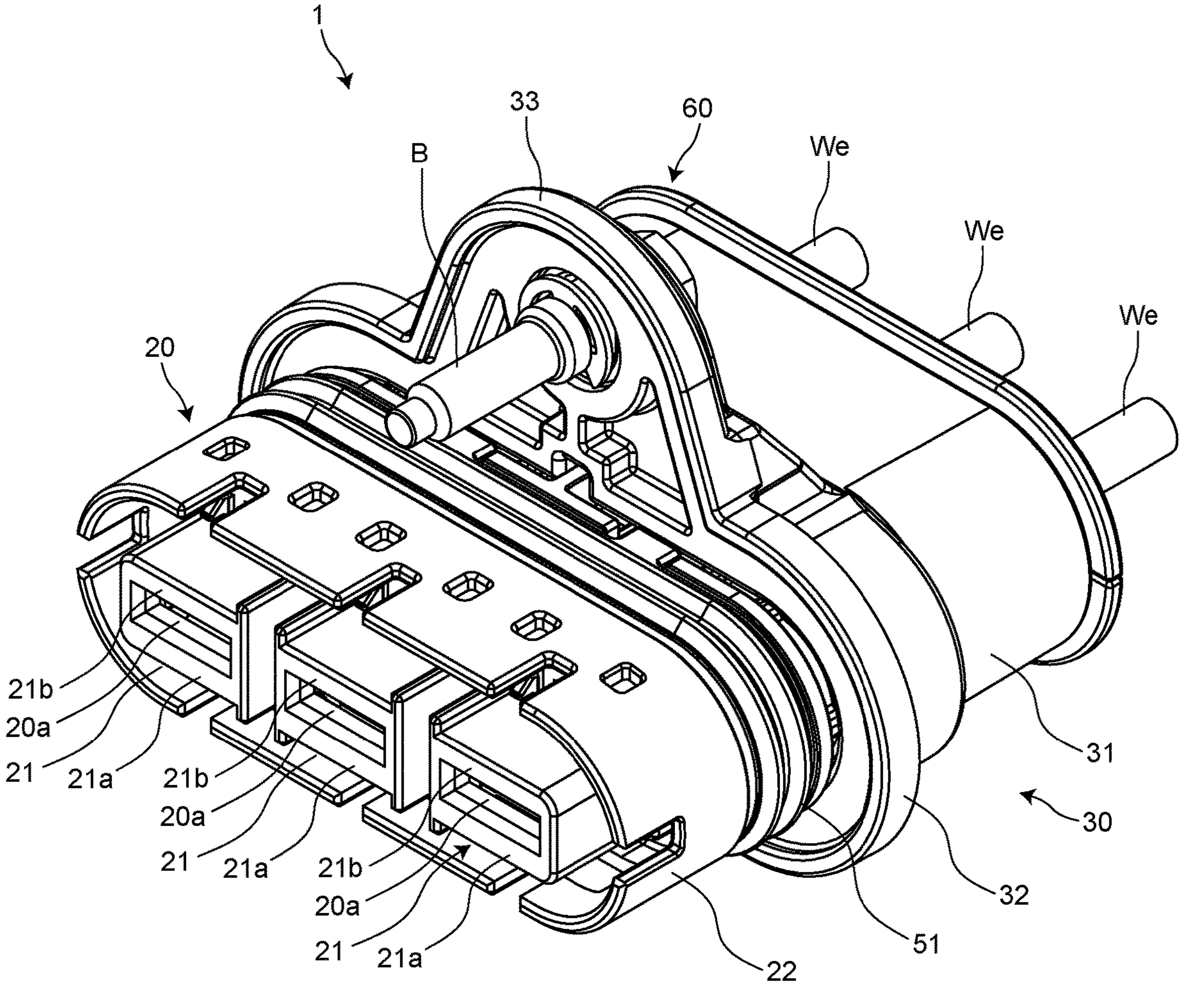
FIG. 1 is a perspective view illustrating a connector of an embodiment.

A connector according to the present invention includes at least a terminal fitting, a housing, and a retaining member. The terminal fitting includes a terminal connection portion physically and electrically connected to a mating terminal fitting. The housing is provided with a terminal housing portion that allows the terminal fitting to be inserted into and accommodated inside a terminal housing chamber in a terminal insertion direction. The retaining member is held by the terminal housing portion at an assembly completed position to the terminal housing portion, and locks movement of the terminal fitting with respect to the terminal housing portion at the assembly completed position in a terminal extraction direction opposite a terminal insertion direction. That is, the retaining member is a member that is assembled to the housing to prevent the terminal fitting from coming off from the terminal housing chamber, and the terminal fitting is held in the housing by retaining the terminal fitting.

In the connector according to the present invention, the terminal housing chamber is formed as an interior space that allows relative movement of the terminal fitting in an alignment direction orthogonal to the terminal insertion direction. Furthermore, the retaining member is provided with a terminal locking portion disposed facing a locked portion of the terminal fitting on the terminal extraction direction side at the assembly completed position to the terminal housing portion to lock movement of the locked portion in the terminal extraction direction. The terminal fitting is provided with a retainer housing portion that accommodates the terminal locking portion of the retaining member at the assembly completed position and allows relative movement of the terminal fitting with respect to the terminal locking portion in the alignment direction. The connector according to the present invention thus includes the terminal fitting, the housing, and the retaining member, thereby providing both an alignment function and a holding function of the terminal fitting.

An embodiment of the connector according to the present invention will be described in detail below with reference to the drawings. Note that this invention is not limited by this embodiment.

Embodiment

One embodiment of the connector according to the present invention will be described with reference to FIGS. 1 to 13.

A reference sign 1 in FIGS. 1 to 7 indicates the connector of the present embodiment. The connector 1 is attached to an end portion of an electric wire We, and is electrically connected to a device (not illustrated) connected to the end portion of the electric wire We. By making an electrical connection to a mating terminal fitting 510 of a mating device 500 (FIG. 2), the connector 1 makes an electrical connection between the mating device 500 and the device connected to the end portion of the electric wire We. For example, here, the device connected to the end portion of the electric wire We is an inverter of a vehicle, and the mating device 500 is a rotating machine of the vehicle.

Figure 3:
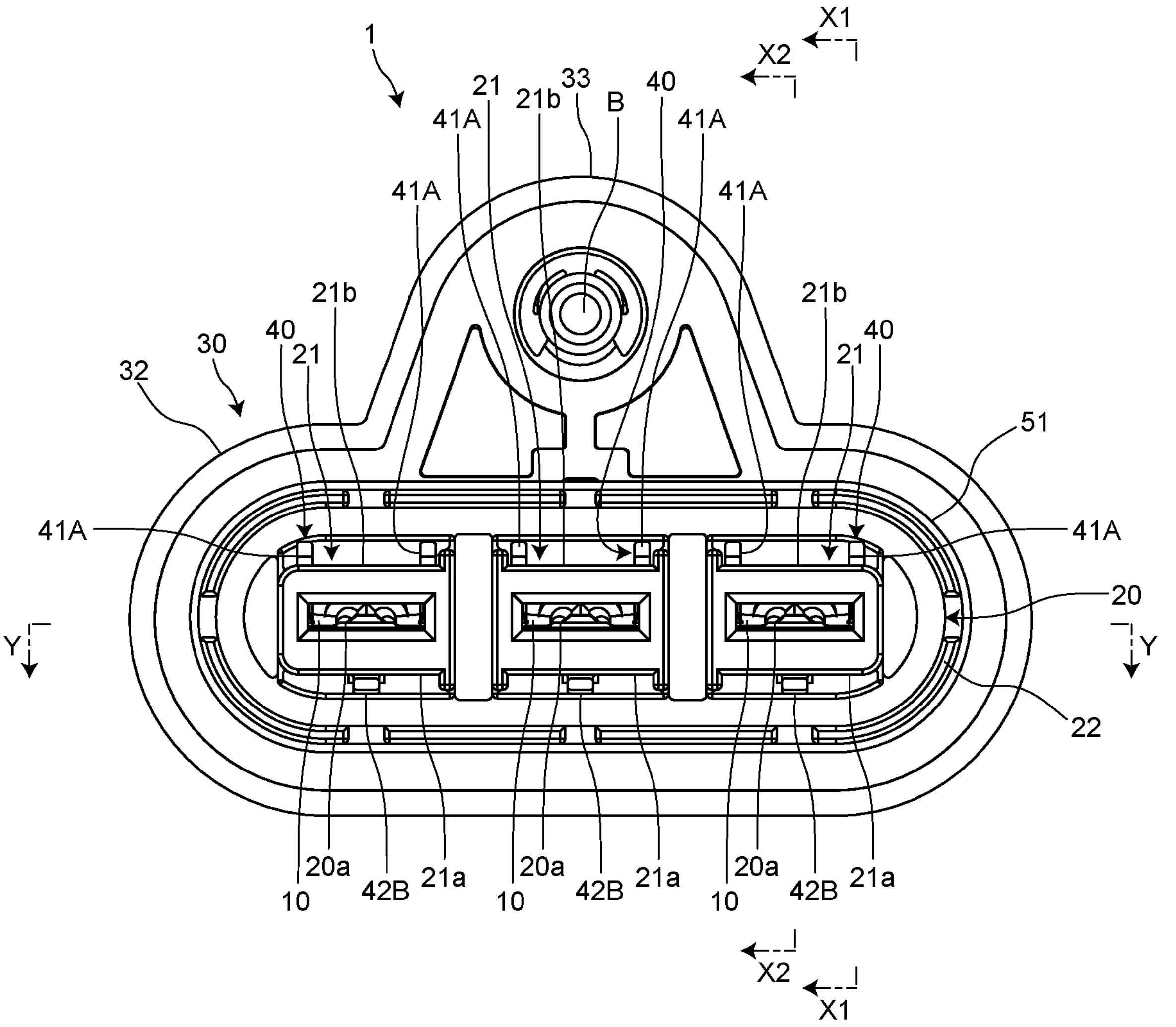
FIG. 3 is a plan view illustrating the connector of the embodiment.
Figure 7:
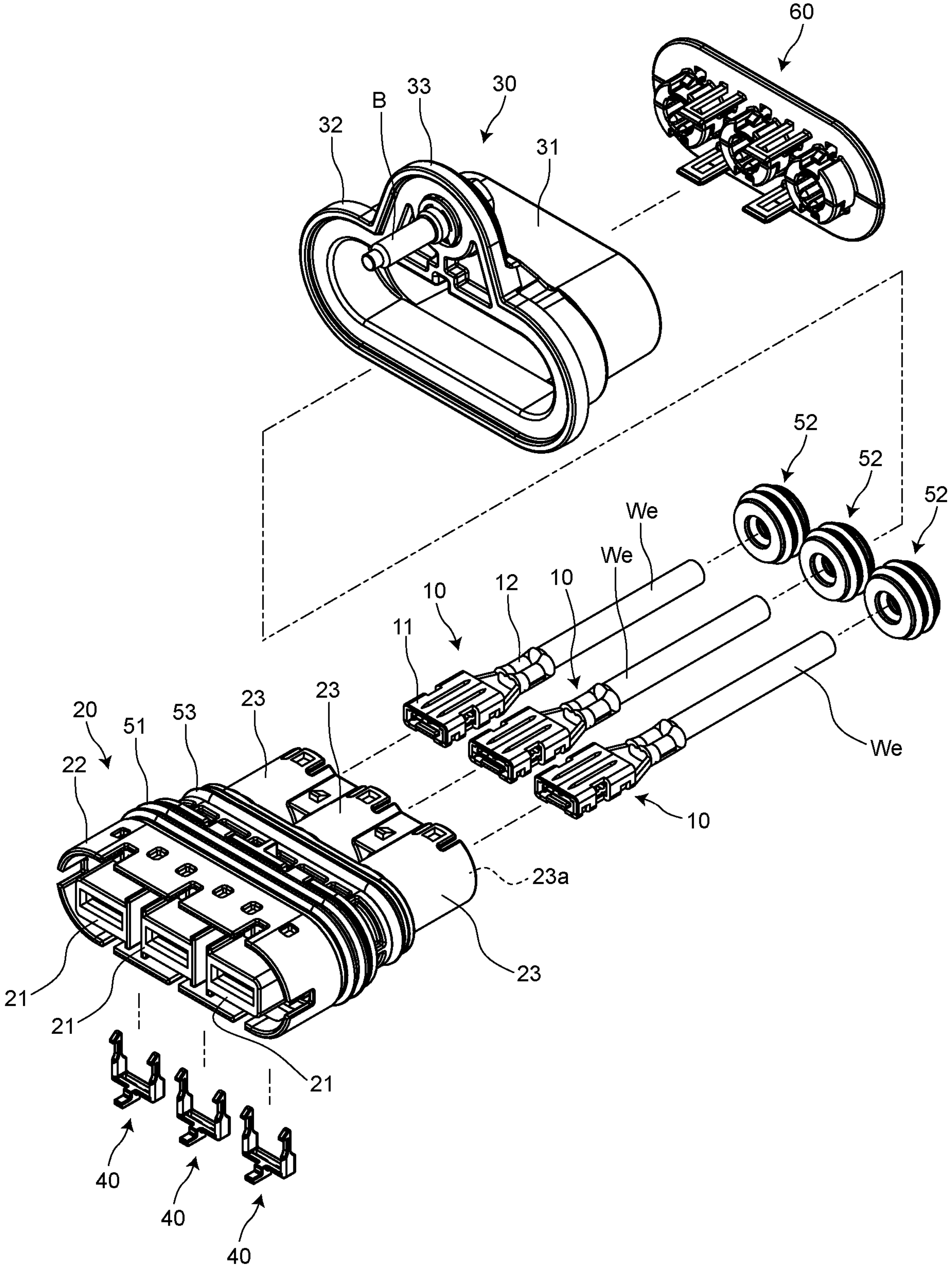
FIG. 7 is an exploded perspective view illustrating the connector of the embodiment.

The connector 1 includes a terminal fitting 10, a housing 20, a shield shell 30, and a retaining member 40 (FIGS. 3 and 7).

The terminal fitting 10 is molded using a conductive material such as metal. For example, the terminal fitting 10 is molded into a predetermined shape by press forming such as bending or cutting a metal plate as a base material. The terminal fitting 10 is attached to the end portion of the electric wire We for electrical connection to the electric wire We. The terminal fitting 10 is electrically connected to the mating terminal fitting 510. Therefore, the terminal fitting 10 includes a terminal connection portion 11 physically and electrically connected to the mating terminal fitting 510 and an electric wire connection portion 12 physically and electrically connected to the end portion of the electric wire We (FIG. 7).

The terminal connection portion 11 may have, for example, fitting connection with a mating terminal connection portion 511 of the mating terminal fitting 510, or may be screwed and fixed to the mating terminal connection portion 511. The terminal connection portion 11 of the present embodiment is formed to have fitting connection to the mating terminal connection portion 511 in a fitting connection direction along the terminal insertion direction into the housing 20. Therefore, one of the terminal connection portion 11 and the mating terminal connection portion 511 is formed into a female terminal shape, and the other is formed into a male terminal shape.

Figure 2:
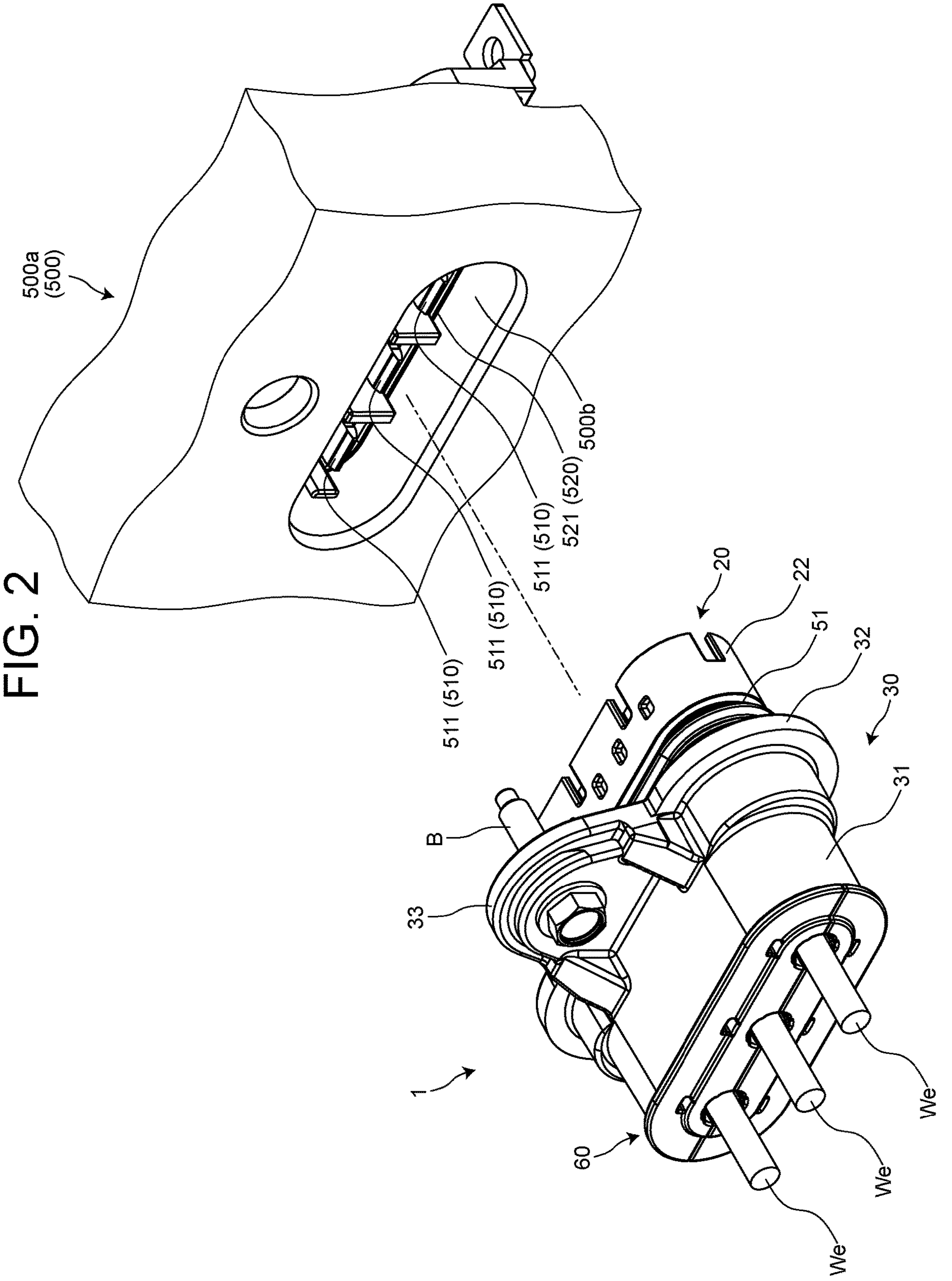
FIG. 2 is a perspective view of the connector of the embodiment together with a mating connector viewed from a different angle.

The terminal connection portion 11 illustrated here is formed into a tubular female terminal shape that allows the mating terminal connection portion 511 to be inserted in the terminal extraction direction from the housing 20. The terminal connection portion 11 is formed, for example, into a square tubular shape or a cylindrical shape. Here, the terminal connection portion 11 is formed into the square tubular shape. Therefore, the mating terminal connection portion 511 illustrated here is formed into a male terminal shape of a single piece shape (so-called male tab shape) (FIG. 2).

Figure 6:
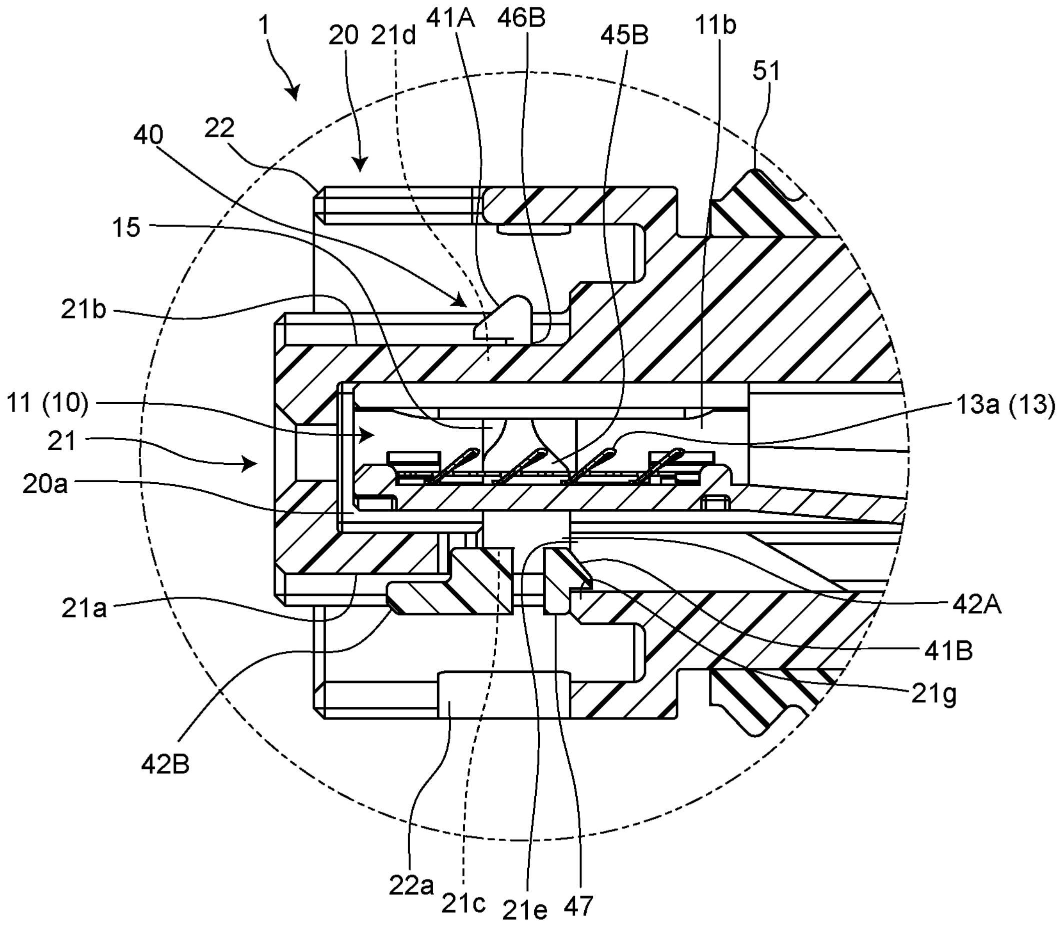
FIG. 6 is a partially enlarged view of a cross section of the line X2-X2 of FIG. 3.

The terminal connection portion 11 illustrated here is provided with an integral or separate elastic contact portion 13*a* inside thereof (FIG. 6). The elastic contact portion 13*a* is a portion that secures contact pressure between the contact and the mating terminal connection portion 511 by elastic force accompanying elastic deformation. Here, a contact member 13 separate from the terminal fitting 10 includes the elastic contact portion 13*a*. In the connector 1, the contact member 13 is assembled inside the terminal connection portion 11, whereby the elastic contact portion 13*a* is disposed inside the terminal connection portion 11. The elastic contact portion 13*a* comes in contact with one surface of the mating terminal connection portion 511 of a single piece shape, and applies, for example, elastic force in the orthogonal direction to the surface.

The electric wire connection portion 12 is physically and electrically connected to the electric wire We, for example, by crimping or welding a core wire of the end portion of the electric wire We. The electric wire connection portion 12 illustrated here is crimped onto the core wire by caulking two barrel pieces onto the exposed core wire for connection.

The terminal fitting 10 in this example is molded to have a straight shape in which the terminal connection portion 11 and the electric wire connection portion 12 are disposed on a straight line. Therefore, the electric wire We is drawn out from the electric wire connection portion 12 in an extension direction of the terminal fitting 10 along the straight line. However, in the terminal fitting 10, the terminal connection portion 11 and the electric wire connection portion 12 may be disposed to cross each other, such as being disposed orthogonally.

The connector 1 illustrated here includes three pairs of the terminal fitting 10 and the electric wire We.

The housing 20 is molded using an insulating material such as synthetic resin. The housing 20 accommodates the terminal fitting 10 and the electric wire We inside. In the housing 20, the terminal fitting 10 is held in an accommodated state, and the electric wire We is drawn out from inside.

The housing 20 includes a terminal housing portion 21 that allows the terminal fitting 10 to be inserted and accommodated in an inside terminal housing chamber 20*a* in the terminal insertion direction (FIGS. 1, 3 to 6, 11 to 13).

Figure 4:
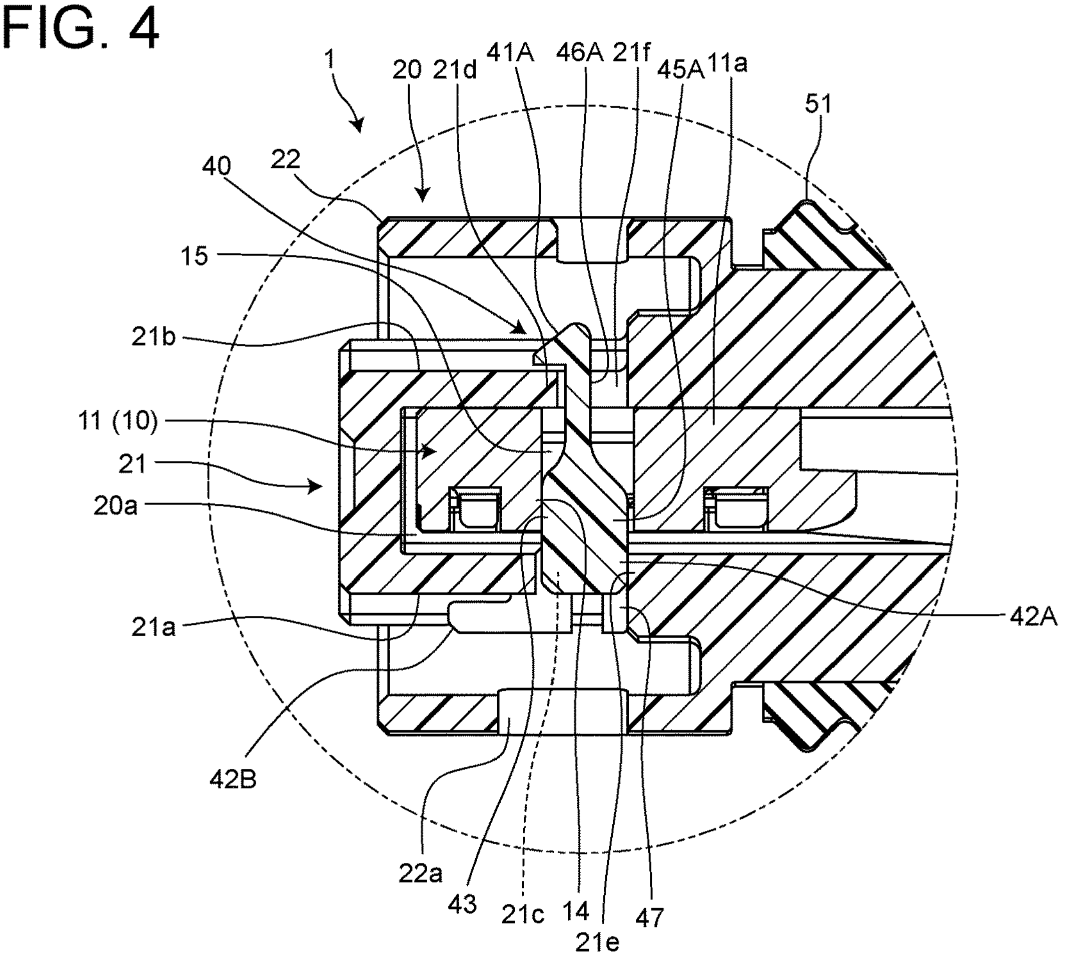
FIG. 4 is a partially enlarged view of a cross section of the line X1-X1 of FIG. 3.
Figure 5:
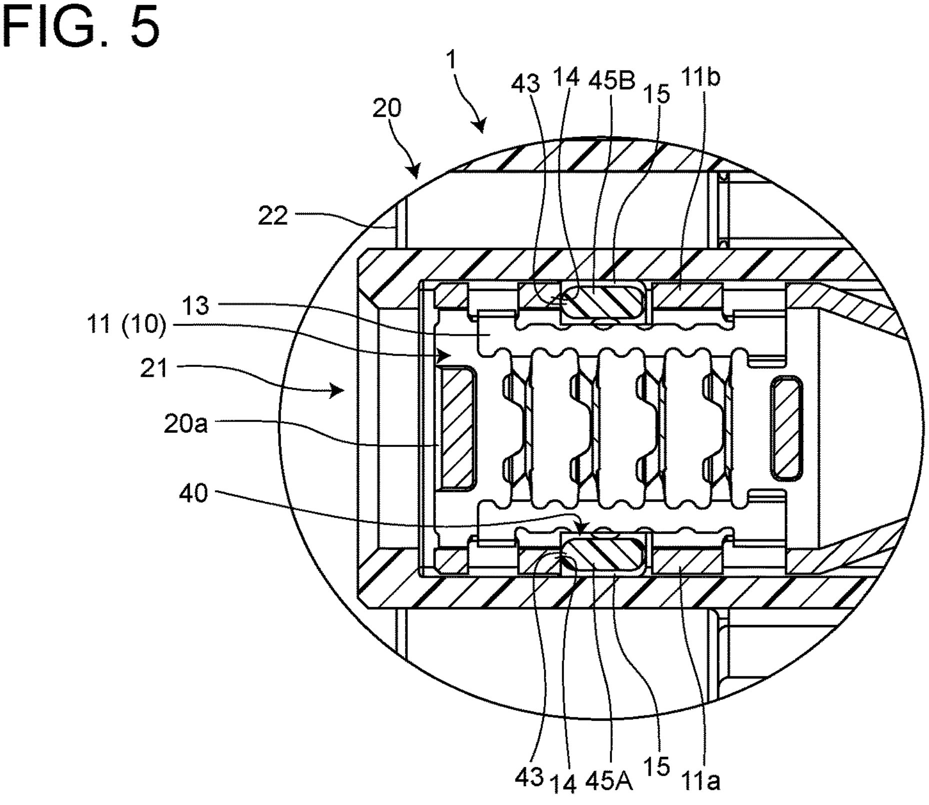
FIG. 5 is a partially enlarged view obtained by rotating a cross section of the line Y-Y of FIG. 3 by 90 degrees.

In the connector 1, in order to generate just enough contact pressure between the contact and the mating terminal connection portion 511 due to elastic deformation of the elastic contact portion 13*a*, the terminal fitting 10 is accommodated in the terminal housing chamber 20*a* in the action direction of the contact pressure so as to move relatively to the mating terminal connection portion 511. That is, the connector 1 has an alignment function of the terminal fitting 10 in the action direction of the contact pressure. Therefore, the terminal housing chamber 20*a* is formed as an interior space that allows relative movement of the terminal fitting 10 in the alignment direction orthogonal to the terminal insertion direction. Therefore, the terminal housing chamber 20*a* is formed such that the terminal fitting 10 can be disposed with a gap from each of a first wall 21*a* and a second wall 21*b* of the terminal housing portion 21 (FIGS. 4 and 6).

The first wall 21*a* and the second wall 21*b* are walls forming the terminal housing chamber 20*a* in the terminal housing portion 21, and are disposed facing each other with a space in the alignment direction. In the terminal housing chamber 20*a*, the size of the gap between the first wall 21*a* and the terminal fitting 10 and the size of the gap between the second wall 21*b* and the terminal fitting 10 are set such that the amount of relative movement of the terminal fitting 10 with respect to the mating terminal connection portion 511 is secured, the amount of relative movement being large enough to generate just enough contact pressure between the contact of the elastic contact portion 13*a* and the mating terminal connection portion 511.

The terminal housing portion 21 illustrated here is formed into a square tubular shape, and the terminal connection portion 11 having the square tubular shape is accommodated in the terminal housing chamber 20*a* inside the terminal housing portion. In the terminal housing portion 21 illustrated here, one of two pairs of walls disposed facing each other with a space therebetween are the first wall 21*a* and the second wall 21*b*. In the terminal housing chamber 20*a*, one wall of the terminal connection portion 11 is disposed facing the first wall 21*a*, and the other wall of the terminal connection portion 11 that is disposed facing the wall of the terminal connection portion 11 with a space is disposed facing the second wall 21*b*. In the terminal housing portion 21 illustrated here, the mating terminal connection portion 511 is inserted into the terminal housing chamber 20*a* from one opening in the tube axis direction, and the mating terminal connection portion 511 is inserted into the terminal connection portion 11 in the terminal housing chamber 20*a*.

The housing 20 includes the terminal housing portion 21 for each terminal fitting 10. In the housing 20, respective terminal housing portions 21 are arranged in an orthogonal direction with respect to the terminal insertion direction and the alignment direction with a space. The housing 20 includes a tubular hood portion 22 covering respective terminal housing portions 21 from outside with a space (FIGS. 1 to 7). The hood portion 22 illustrated here is formed into a long cylindrical shape with the terminal insertion direction as the tube axis direction. In the housing 20, a long cylindrical mating terminal housing portion 521 of a mating housing 520 is inserted into a long annular gap between the hood portion 22 and each terminal housing portion 21 (FIG. 2). Along with this, each mating terminal connection portion 511 inside the mating terminal housing portion 521 is inserted into each terminal housing chamber 20*a*.

The mating housing 520 is fixed to an enclosure 500*a* of the mating device 500 and is disposed in an oval through-hole 500*b* of the enclosure 500*a* (FIG. 2). A long cylindrical sealing member 51 is assembled to the oval outer peripheral surface of the housing 20 (FIGS. 1 to 4, 6, 7). The sealing member 51 is a waterproof member that partially fills the long cylindrical gap between an oval outer peripheral surface of the housing 20 and the inner peripheral surface of the through-hole 500*b* of the enclosure 500*a*.

A cylindrical electric wire housing portion 23 is provided in the housing 20 for each electric wire We to accommodate the electric wire We inside and draw the wire out to the outside (FIG. 7). A cylindrical sealing member 52 is assembled inside the electric wire housing portion 23 to fill part of the cylindrical gap between the inner peripheral surface of the electric wire housing portion and the outer peripheral surface of the electric wire We (FIG. 7). The terminal fitting 10 attached to the end portion of the electric wire We is inserted from an electric wire outlet 23*a* of the electric wire housing portion 23 into the terminal housing chamber 20*a* (FIG. 7). The connector 1 includes a rear holder 60 that is fit in the gap between the electric wire outlet 23*a* of each electric wire housing portion 23 and the electric wire We (FIGS. 1, 2, 7).

The shield shell 30 inhibits intrusion of external noise into the inside electric wire We by covering each electric wire housing portion 23 from outside. For this purpose, the shield shell 30 is molded using a metal material (for example, aluminum or aluminum alloy).

The shield shell 30 includes a long cylindrical tube portion 31 that covers each electric wire housing portion 23 from outside (FIGS. 1, 2, 7). A long annular sealing member 53 is assembled to the oval outer peripheral surface of the housing 20 (FIG. 7). The sealing member 53 is a waterproof member that partially fills the long cylindrical gap between the oval outer peripheral surface of the housing 20 and the inner peripheral surface of the tube portion 31 of the shield shell 30.

A long annular flange portion 32 is coupled to the tube portion 31 (FIGS. 1 to 3 and 7). In the shield shell 30, a fixing portion 33 protruding from the flange portion 32 is screwed and fixed to the enclosure 500*a* of the mating device 500 with a male screw member B (FIG. 2).

The retaining member 40 is molded using an insulating material such as synthetic resin. The retaining member 40 is assembled to the terminal housing portion 21 to inhibit the terminal fitting 10 from shifting toward the electric wire outlet 23*a* and prevents the terminal fitting 10 from coming out of the electric wire outlet 23*a* at the assembly completed position. The retaining member 40 may be provided for each terminal fitting 10, may be provided for each of the plurality of terminal fittings 10, and may retain all the terminal fittings 10. One retaining member 40 illustrated here is provided to each terminal fitting 10.

The retaining member 40 is held by the terminal housing portion 21 at the assembly completed position to the terminal housing portion 21. Therefore, the retaining member 40 is provided with a held portion 41A that is held by the terminal housing portion 21 (FIGS. 3, 4, 6, 8 to 11, 13). Furthermore, the retaining member 40 is provided with a locked portion (hereinafter referred to as "first locked portion") 42A for causing the terminal housing portion 21 to lock movement of the terminal housing portion 21 in the terminal extraction direction (FIGS. 4, 6, 8 to 10, 13). Meanwhile, the terminal housing portion 21 is provided with a retainer insertion hole 21*c* that causes the retaining member 40 to be inserted into the terminal housing chamber 20*a* in the retainer insertion direction toward one alignment direction, and a retainer holding portion 21*d* disposed facing the held portion 41A of the retaining member 40 at the assembly completed position in the retainer extraction direction opposite the retainer insertion direction to lock movement of the held portion 41A in the retainer extraction direction (FIGS. 4, 6, 11 to 13). Furthermore, the terminal housing portion 21 is provided with a retainer locking portion 21*e* disposed facing the first locked portion 42A of the retaining member 40 at the assembly completed position on the terminal extraction direction side to lock movement of the first locked portion 42A of the retaining member 40 in the terminal extraction direction (FIGS. 4, 6, 13).

In the terminal housing portion 21 illustrated here, the first wall 21*a* includes the retainer insertion hole 21*c* (FIGS. 4, 6, 10, 12, 13). The retainer insertion hole 21*c* is a through-hole through which the retaining member 40 is inserted from the first wall 21*a* side toward the second wall 21*b*. Furthermore, in the first wall 21*a*, a surrounding wall on the terminal extraction direction side of the retainer insertion hole 21*c* is used as the retainer locking portion 21*e* (FIGS. 4, 6, 13).

Meanwhile, the retainer insertion hole 21*c* is covered with the hood portion 22 from outside. Therefore, the housing 20 is provided with a through-hole 22*a* at a place of the hood portion 22 facing the retainer insertion hole 21*c*, and the retaining member 40 is inserted into the retainer insertion hole 21*c* via the through-hole 22*a* (FIGS. 4, 6, 10, 13).

Figure 10:
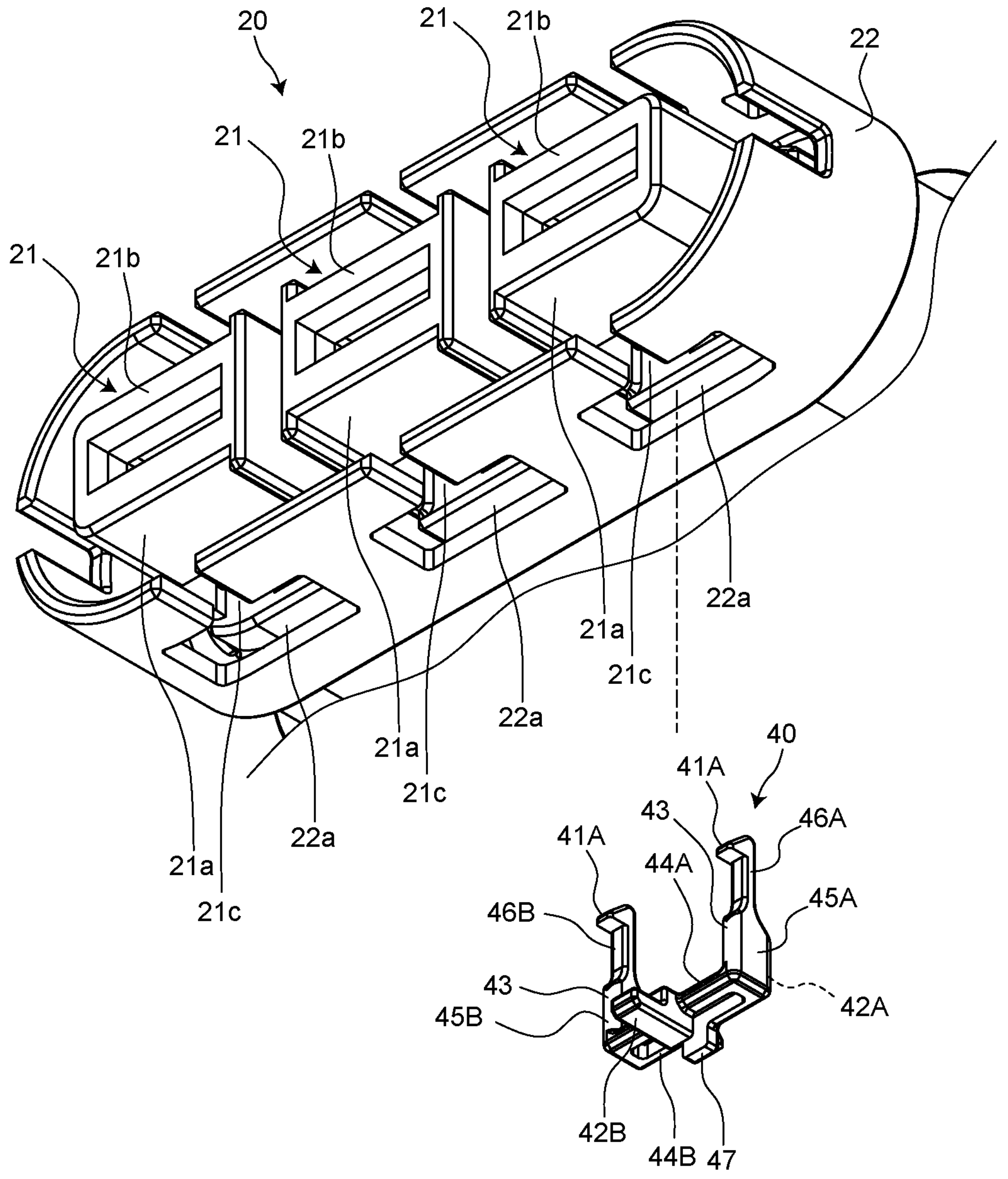
FIG. 10 is an exploded perspective view of a terminal housing portion and the retaining member.
Figure 11:
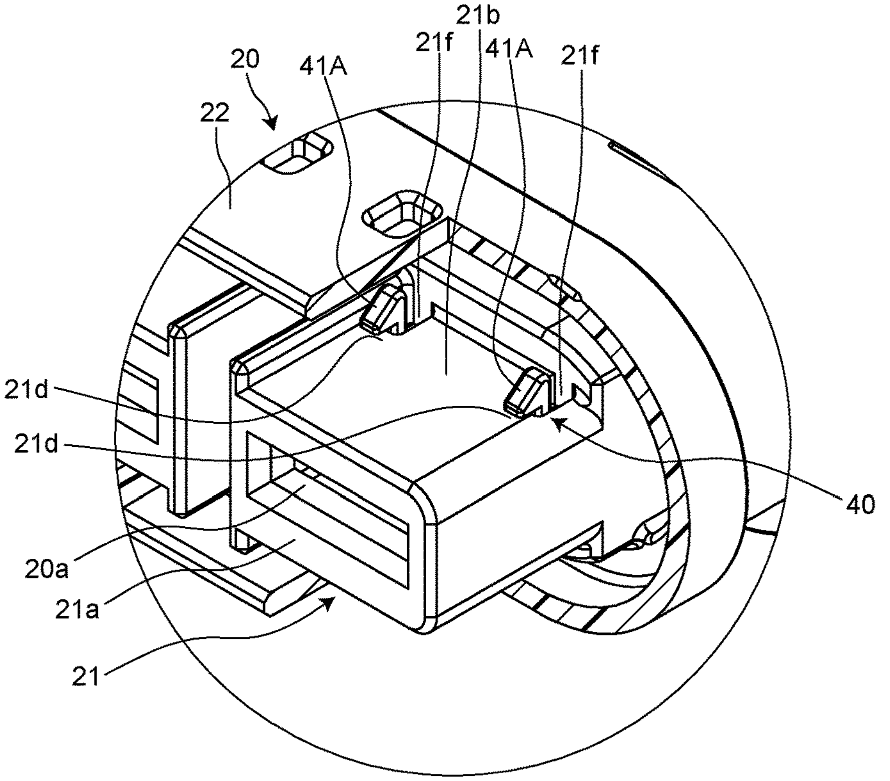
FIG. 11 is a perspective view illustrating the inside terminal housing portion and the retaining member in the locked state with a part of a housing cut out.

In the terminal housing portion 21 illustrated here, the second wall 21*b* includes a retainer inserting hole 21*f* through which the held portion 41A of the retaining member 40 is inserted from the terminal housing chamber 20*a* to outside (FIGS. 4, 11, 13). The retainer inserting hole 21*f* is a through-hole that allows the held portion 41A inserted from the retainer insertion hole 21*c* into the terminal housing chamber 20*a* to leave the terminal housing chamber 20*a* to outside the chamber in the retainer insertion direction. Furthermore, in the second wall 21*b*, a surrounding wall of the retainer inserting hole 21*f* is used as the retainer holding portion 21*d* (FIGS. 4, 11, 13). The retainer holding portion 21*d* of the second wall 21*b* illustrated here uses a surrounding wall on the terminal insertion direction side of the retainer inserting hole 21*f* in the second wall 21*b*. The held portion 41A illustrated here is formed as a protrusion that protrudes in the terminal insertion direction and causes the surrounding walls of the retainer inserting hole 21*f* on the terminal insertion direction side to be disposed facing each other in the retainer extraction direction when the retaining member 40 is at the assembly completed position (FIGS. 4, 8, 9 to 11, 13). Here, the held portion 41A is formed in a claw shape.

Furthermore, besides the combination of the held portion 41A and the retainer holding portion 21*d*, the connector 1 illustrated here is provided with another combination of a held portion 41B and a retainer holding portion 21*g* (FIG. 6). That is, apart from the one held portion 41A that is locked by the retainer holding portion 21*d* of the second wall 21*b*, the retaining member 40 includes the other held portion 41B held by the terminal housing portion 21. Besides the one retainer holding portion 21*d* provided in the second wall 21*b*, the terminal housing portion 21 includes the other retainer holding portion 21*g* disposed facing the other held portion 41B of the retaining member 40 at the assembly completed position in the retainer extraction direction to lock movement of the other held portion 41B in the retainer extraction direction. The other retainer holding portion 21*g* is provided in the first wall 21*a*. For example, the other retainer holding portion 21*g* of the first wall 21*a* illustrated here uses a surrounding wall on the terminal extraction direction side of the retainer insertion hole 21*c* in the first wall 21*a*. The other held portion 41B illustrated here is formed as a protrusion that protrudes in the terminal extraction direction and causes the surrounding walls of the retainer insertion hole 21*c* on the terminal extraction direction side to be disposed facing each other in the retainer extraction direction when the retaining member 40 is at the assembly completed position. Here, the other held portion 41B is formed in a claw shape.

Figure 8:
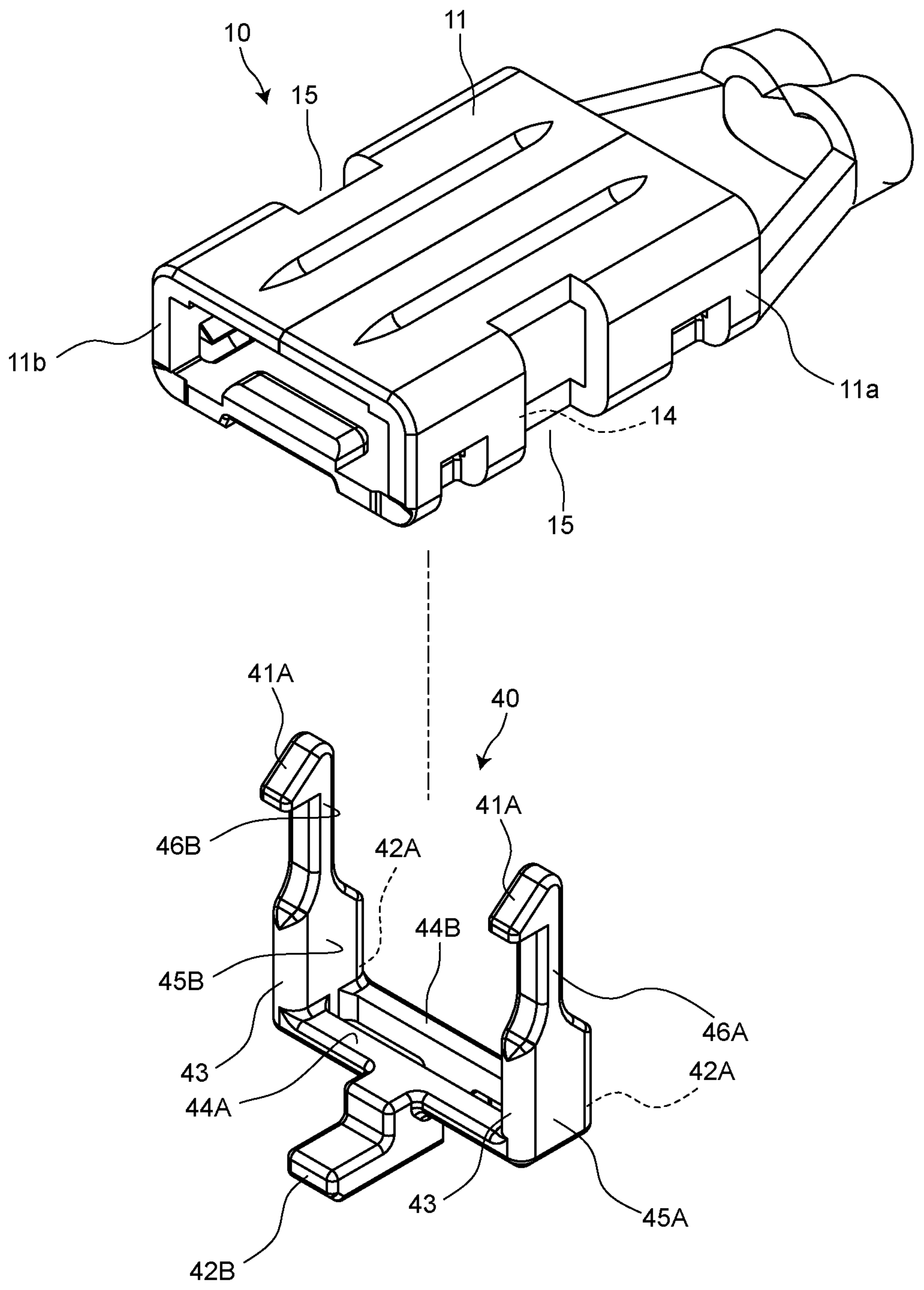
FIG. 8 is an exploded perspective view of a terminal fitting and a retaining member.
Figure 9:
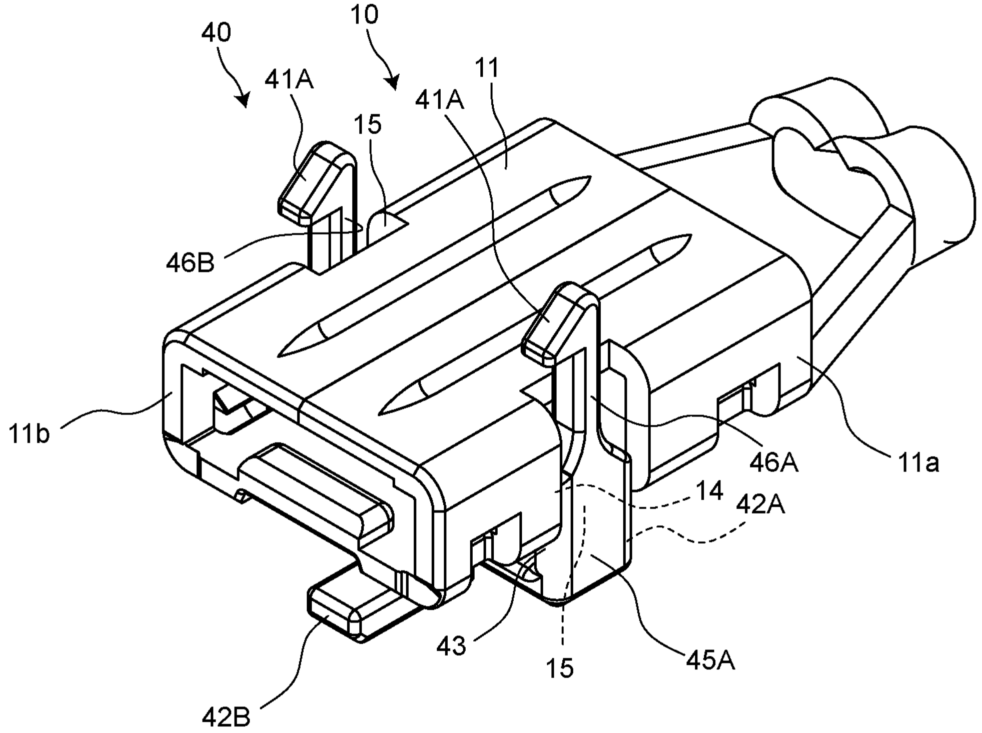
FIG. 9 is a perspective view illustrating the terminal fitting and the retaining member in a locked state.

Furthermore, the connector 1 illustrated here is provided with two combinations of the one held portion 41A and the retainer holding portion 21*d* (FIGS. 3, 8, 9, 11, 13), and one combination of the other held portion 41B and the retainer holding portion 21*g* (FIG. 6). The connector 1 illustrated here is provided with two combinations of the first locked portion 42A and the retainer locking portion 21*e* (FIG. 8). In the connector 1 illustrated here, the retaining member 40 is held by the terminal housing portion 21 at the assembly completed position to the terminal housing portion 21, by two combinations of the one held portion 41A and the retainer holding portion 21*d*, one combination of the other held portion 41B and the retainer holding portion 21*g*, and two combinations of the first locked portion 42A and the retainer locking portion 21*e*.

The retaining member 40 locks movement of the terminal fitting 10 with respect to the terminal housing portion 21 in the terminal extraction direction at the assembly completed position to the terminal housing portion 21. Therefore, the retaining member 40 is provided with a terminal locking portion 43 disposed facing the terminal fitting 10 on the terminal extraction direction side at the assembly completed position to the terminal housing portion 21 to lock movement of the terminal fitting 10 in the terminal extraction direction (FIGS. 4, 5, 8 to 10, 13). Meanwhile, the terminal fitting 10 is provided with a locked portion 14 disposed facing the terminal locking portion 43 of the retaining member 40 at the assembly completed position on the terminal insertion direction side to cause the terminal locking portion 43 to lock movement in the terminal extraction direction (FIGS. 4, 5, 8, 9, 13). Furthermore, the terminal fitting 10 is provided with a retainer housing portion 15 that accommodates the terminal locking portion 43 of the retaining member 40 at the assembly completed position and allows relative movement of the terminal fitting with respect to the terminal locking portion 43 in the alignment direction (FIGS. 4 to 6, 8, 9, 13).

The retainer housing portion 15 illustrated here is formed in respective side walls 11*a* and 11*b* in a direction orthogonal to the terminal insertion direction and the alignment direction in the terminal connection portion 11 by cutting out the side walls 11*a* and 11*b* (FIGS. 4 to 6, 8, 9, 13). Each retainer housing portion 15 is a space obtained by partially cutting each of the side walls 11*a* and 11*b* in the alignment direction. Therefore, the retaining member 40 is provided with the terminal locking portion 43 for each retainer housing portion 15. When the retaining member 40 is at the assembly completed position, each retainer housing portion 15 accommodates the terminal locking portions 43, and thus the wall of the terminal housing portion 21 exists on the terminal insertion direction side of the terminal locking portion 43. Therefore, as the locked portion 14 of the terminal fitting 10 illustrated here, the surrounding wall on the terminal insertion direction side of each retainer housing portion 15 is used.

Figure 12:
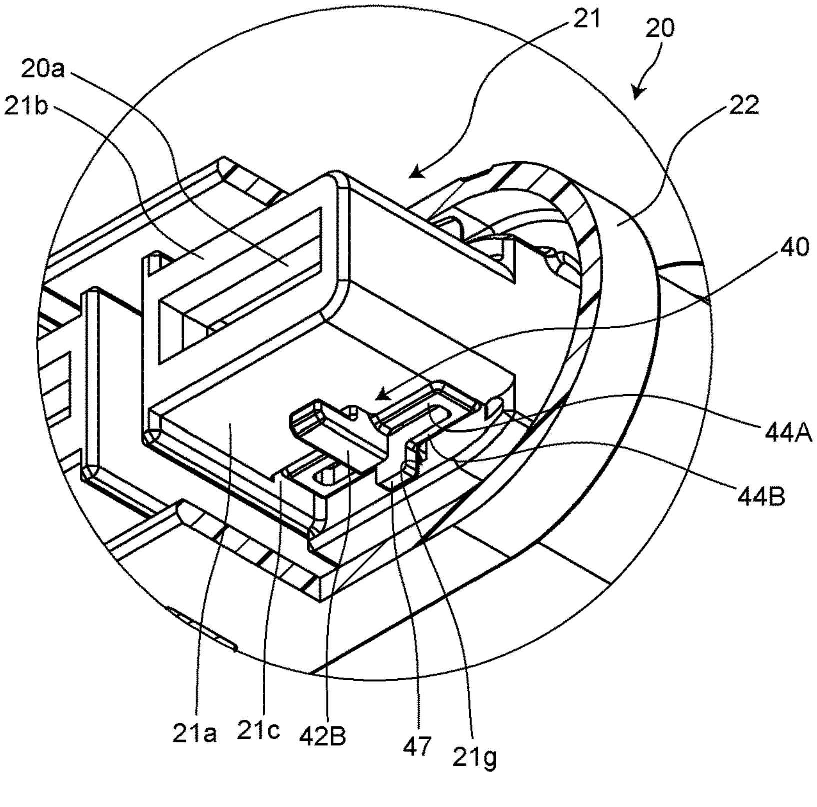
FIG. 12 is a perspective view of the inside terminal housing portion and the retaining member in the locked state with a part of the housing cut out viewed from the different angle.
Figure 13:
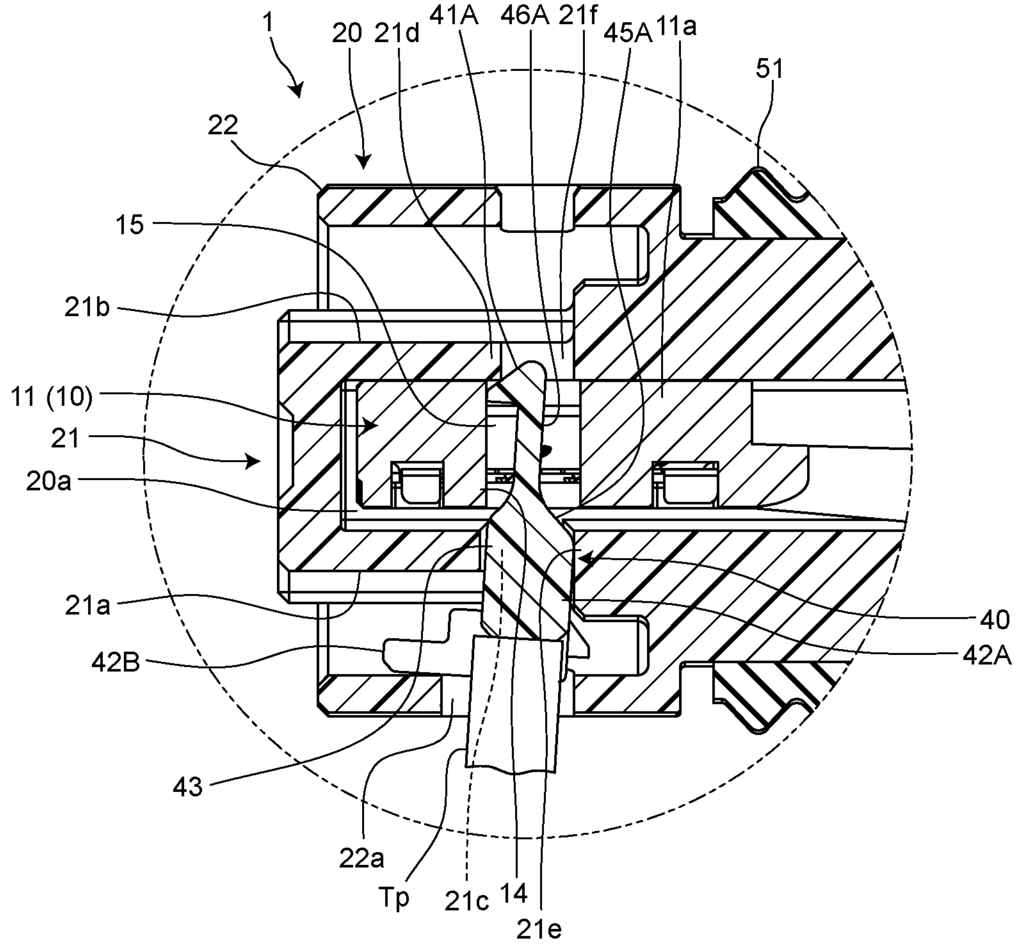
FIG. 13 is a partially enlarged view corresponding to the cross section of the line X1-X1 of FIG. 3 and is an explanatory view illustrating an assembly process of the retaining member.

Specifically, the retaining member 40 illustrated here includes a shaft-shaped first shaft portion 44A and a second shaft portion 44B disposed facing each other with a space in the terminal insertion direction and extending in a direction orthogonal to the terminal insertion direction and the alignment direction (FIGS. 8, 10, 12). The retaining member 40 illustrated here includes a first piece portion 45A of a single piece shape that couples one end of the first shaft portion 44A and one end of the second shaft portion 44B and extends from the end side in the retainer insertion direction, and a second piece portion 45B of a single piece shape that couples the other end of the first shaft portion 44A and the other end of the second shaft portion 44B and extends from the end side in the retainer insertion direction (FIGS. 4 to 6, 8 to 10, 13).

Here, the first shaft portion 44A is disposed on the terminal insertion direction side, and the second shaft portion 44B is disposed on the terminal extraction direction side. In the retaining member 40, the second shaft portion 44B supported by both the first piece portion 45A and the second piece portion 45B has, for example, flexibility that allows bending in the terminal insertion direction and terminal extraction direction. In the retaining member 40, the first shaft portion 44A and the second shaft portion 44B are disposed in the retainer insertion hole 21*c* at the assembly completed position to the terminal housing portion 21. Therefore, the retainer insertion hole 21*c* is formed in a shape and size that allow the first shaft portion 44A and the second shaft portion 44B to be disposed.

In the retaining member 40, the end of each of the first piece portion 45A and the second piece portion 45B on the terminal insertion direction side is used as the terminal locking portion 43 (FIGS. 4, 5, 8 to 10, 13). Therefore, when the retaining member 40 is at the assembly completed position to the terminal housing portion 21, the first piece portion 45A is accommodated in one retainer housing portion 15, and the second piece portion 45B is accommodated in the other retainer housing portion 15. Furthermore, in the retaining member 40, the end of each of the first piece portion 45A and the second piece portion 45B on the terminal extraction direction side is used as the first locked portion 42A (FIGS. 4, 6, 8 to 10, 13).

The retaining member 40 illustrated here includes a shaft-like, flexible, cantilevered first flexible portion 46A extending from the first piece portion 45A in the retainer insertion direction, and a shaft-like, flexible, cantilevered second flexible portion 46B extending from the second piece portion 45B in the retainer insertion direction (FIGS. 4, 6, 8 to 10, 13). The first flexible portion 46A and the second flexible portion 46B have flexibility that allows bending in the terminal insertion direction and the terminal extraction direction. One held portion 41A is provided at a free end of each of the first flexible portion 46A and the second flexible portion 46B.

The retaining member 40 illustrated here includes a protrusion 47 protruding in the retainer extraction direction from the center of an extension direction in the second shaft portion 44B (FIGS. 4, 6, 10, 12). The protrusion 47 illustrated here is formed into a square shape, with the other held portion 41B protruding from the wall surface on the terminal extraction direction side (FIGS. 6, 10, 12).

The retaining member 40 illustrated here includes a locked portion (hereinafter referred to as "second locked portion") 42B that is locked by the terminal housing portion 21 to prevent the retaining member 40 from being pushed in the retainer insertion direction across the assembly completed position to the terminal housing portion 21 (FIGS. 3, 4, 6, 8 to 10, 12, 13). The second locked portion 42B protrudes from the center of the extending direction of the first shaft portion 44A in the retainer extraction direction and the terminal insertion direction, and is locked by the second wall 21*b* of the terminal housing portion 21.

For example, by using a jig Tp to push and move the first shaft portion 44A and the second shaft portion 44B in the retainer insertion direction (FIG. 13), the retaining member 40 illustrated here is assembled to the terminal housing portion 21 while being pushed in with the jig Tp. At this time, in the retaining member 40, when the one held portion 41A passes through the retainer housing portion 15 of the terminal fitting 10, for example, the one held portion 41A is pushed and inclined by the locked portion 14 of the terminal fitting 10. In the retaining member 40, when the one held portion 41A passes through the retainer inserting hole 21*f* of the terminal housing portion 21, the one held portion 41A is pushed against a peripheral edge of the retainer inserting hole 21*f* in the second wall 21*b* of the terminal housing portion 21, and the first flexible portion 46A and the second flexible portion 46B bend on the terminal extraction direction side. Furthermore, in the retaining member 40, when the other held portion 41B passes through the retainer insertion hole 21*c* of the terminal housing portion 21, the other held portion 41B is pushed against a peripheral edge of the retainer insertion hole 21*c* in the first wall 21*a* of the terminal housing portion 21, and the second shaft portion 44B bends on the terminal insertion direction side. In the retaining member 40, when the one held portion 41A passes through the retainer inserting hole 21*f*, bending of the first flexible portion 46A and the second flexible portion 46B is dissolved, and the one held portion 41A is disposed in a state of being able to be locked by the one retainer holding portion 21*d*. Furthermore, in the retaining member 40, when the other held portion 41B passes through the retainer insertion hole 21*c*, bending of the second shaft portion 44B is dissolved, and the other held portion 41B is disposed in a state of being able to be locked by the other retainer holding portion 21*g*.

As described above, in the connector 1 according to the present embodiment, the terminal housing chamber 20*a* of the terminal housing portion 21 of the housing 20 is formed to be an interior space in which the terminal fitting 10 can be moved relatively in the alignment direction orthogonal to the terminal insertion direction, and the retaining member 40 is held at the assembly completed position to the terminal housing portion 21. In the connector 1, the retaining member 40 is provided with the terminal locking portion 43 that locks movement of the locked portion 14 of the terminal fitting 10 at the assembly completed position in the terminal extraction direction. Furthermore, in the connector 1, the terminal fitting 10 is provided with the retainer housing portion 15 that accommodates the terminal locking portion 43 of the retaining member 40 at the assembly completed position and allows relative movement of the terminal fitting with respect to the terminal locking portion 43 in the alignment direction. Therefore, in the connector 1 of the present embodiment, the terminal fitting 10 can be held by the housing 20 in a state where the terminal fitting 10 can be relatively moved in the alignment direction. That is, the connector 1 of the present embodiment allows the terminal fitting 10 to be held by the housing 20 while providing the terminal fitting 10 with the alignment function. In this way, since the terminal fitting 10 has the alignment function in the alignment direction orthogonal to the terminal insertion direction, the connector 1 can obtain appropriate contact pressure with the mating terminal fitting 510. Therefore, in the connector 1, the quality of electrical connection between the terminal fitting 10 and the mating terminal fitting 510 is high, and the occurrence of overload between mating parts can be inhibited.

In a connector according to the embodiment, a terminal housing chamber of a terminal connection portion of a housing is formed to be an interior space in which a terminal fitting can be moved relatively in an alignment direction orthogonal to a terminal insertion direction, and a retaining member is held at an assembly completed position to the terminal connection portion. In the connector, the retaining member is provided with a terminal locking portion that locks movement of a locked portion of the terminal fitting at the assembly completed position in a terminal extraction direction. Furthermore, in the connector, the terminal fitting includes a retainer housing portion that accommodates the terminal locking portion of the retaining member at the assembly completed position and allows relative movement of the terminal fitting with respect to the terminal locking portion in the alignment direction. Therefore, in the connector according to the embodiment, the terminal fitting can be held in the housing in a state where the terminal fitting can relatively move in the alignment direction. That is, the connector according to the embodiment allows the terminal fitting to be held in the housing while providing the terminal fitting with an alignment function.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting including a terminal connection portion that is physically and electrically connected to a mating terminal fitting;

a housing provided with a terminal housing portion that accommodates the terminal fitting inserted in an inside terminal housing chamber in a terminal insertion direction; and a retaining member that is held by the terminal housing portion at an assembly completed position to the terminal housing portion to lock movement of the terminal fitting with respect to the terminal housing portion in a terminal extraction direction opposite the terminal insertion direction at the assembly completed position, wherein the terminal housing chamber is formed as an interior space that allows relative movement of the terminal fitting in an alignment direction orthogonal to the terminal insertion direction, the retaining member includes a terminal locking portion disposed facing a locked portion of the terminal fitting at the assembly completed position on the terminal extraction direction side to lock movement of the locked portion in the terminal extraction direction, the terminal fitting includes a retainer housing portion that accommodates the terminal locking portion of the retaining member at the assembly completed position and allows relative movement of the terminal fitting in the alignment direction with respect to the terminal locking portion, and the retaining member extends through the terminal housing portion.

2. The connector according to claim 1, wherein the retaining member includes: a held portion that is held by the terminal housing portion;

and a locked portion that causes the terminal housing portion to lock movement in the terminal extraction direction with respect to the terminal housing portion, and the terminal housing portion includes: a retainer insertion hole to insert the retaining member into the terminal housing chamber in a retainer insertion direction toward the alignment direction; a retainer holding portion disposed facing the held portion of the retaining member at the assembly completed position in a retainer extraction direction opposite the retainer insertion direction to lock movement of the held portion in the retainer extraction direction; and a retainer locking portion disposed facing the locked portion of the retaining member at the assembly completed position on the terminal extraction direction side to lock movement of the locked portion of the retaining member in the terminal extraction direction.

3. The connector according to claim 2, wherein the terminal housing portion includes a first wall and a second wall forming the terminal housing chamber and disposed facing each other with a space in the alignment direction, the first wall includes the retainer insertion hole and uses a surrounding wall on the terminal extraction direction side of the retainer insertion hole as the retainer locking portion, and the second wall includes a retainer inserting hole that allows the held portion to be inserted outside the chamber from the terminal housing chamber, and uses a surrounding wall of the retainer inserting hole as the retainer holding portion.

4. The connector according to claim 3, wherein the retaining member includes another held portion that is held by the terminal housing portion and provided separately from the one held portion locked by the retainer holding portion of the second wall, and besides the one retainer holding portion provided in the second wall, the terminal housing portion includes, in the first wall, another retainer holding portion disposed facing the other held portion of the retaining member at the assembly completed position in the retainer extraction direction to lock movement of the other held portion in the retainer extraction direction.

5. The connector according to claim 1, wherein the terminal connection portion is formed to have fitting connection to a mating terminal connection portion of the mating terminal fitting in a fitting connection direction along the terminal insertion direction.

6. The connector according to claim 2, wherein the terminal connection portion is formed to have fitting connection to a mating terminal connection portion of the mating terminal fitting in a fitting connection direction along the terminal insertion direction.

7. The connector according to claim 3, wherein the terminal connection portion is formed to have fitting connection to a mating terminal connection portion of the mating terminal fitting in a fitting connection direction along the terminal insertion direction.

8. The connector according to claim 4, wherein the terminal connection portion is formed to have fitting connection to a mating terminal connection portion of the mating terminal fitting in a fitting connection direction along the terminal insertion direction.

9. The connector according to claim 5, wherein the terminal connection portion is formed into a tubular female terminal shape that allows the mating terminal connection portion to be inserted in the terminal extraction direction, the retainer housing portion is formed in side walls in a direction orthogonal to the terminal insertion direction and the alignment direction in the terminal connection portion by cutting the side walls, as the locked portion of the terminal fitting, a surrounding wall on the terminal insertion direction side of the retainer housing portion is used, and the retaining member includes the terminal locking portion for each of the retainer housing portions.

* * * * *